United States Patent [19]

Shimokoriyama

[11] Patent Number: 5,600,661
[45] Date of Patent: Feb. 4, 1997

[54] DEVICE FOR PROCESSING TRANSMITTED DIGITAL VIDEO SIGNAL

[75] Inventor: Makoto Shimokoriyama, Kawasaki, Japan

[73] Assignee: Canon Kabushiki Kaisha, Tokyo, Japan

[21] Appl. No.: 373,503

[22] Filed: Jan. 17, 1995

Related U.S. Application Data

[63] Continuation of Ser. No. 8,828, Jan. 25, 1993, which is a continuation of Ser. No. 523,547, May 15, 1990, abandoned.

[30] Foreign Application Priority Data

May 16, 1989 [JP] Japan ................................. 1-120551
Oct. 23, 1989 [JP] Japan ................................. 1-275490

[51] Int. Cl.⁶ .................................................. H03M 13/00
[52] U.S. Cl. ........................... 371/40.1; 371/5.1; 371/31
[58] Field of Search .......................... 371/31, 40.1, 5.1; 360/38.1; 358/336

[56] References Cited

U.S. PATENT DOCUMENTS

| | | | |
|---|---|---|---|
| 4,199,780 | 4/1980 | Taylor | 360/38.1 |
| 4,234,896 | 11/1980 | Onishi et al. | 360/38.1 |
| 4,329,708 | 5/1982 | Yamamoto | 371/31 |
| 4,497,055 | 1/1985 | Hoshino et al. | 371/31 |
| 4,591,925 | 5/1986 | Trytko | 360/38.1 |
| 4,641,309 | 2/1987 | Nakano et al. | 371/31 |
| 4,751,704 | 6/1988 | Kojima | 371/37.2 |
| 4,792,953 | 12/1988 | Pasdera et al. | 371/31 |
| 4,811,120 | 3/1989 | Kashida et al. | 371/5 |
| 4,812,925 | 3/1989 | Opelt | 358/336 |
| 4,831,624 | 5/1989 | McLaughlin et al. | 371/31 |
| 4,870,510 | 9/1989 | Edakubo et al. | 360/27 |
| 4,887,044 | 12/1989 | Inoue | 329/300 |
| 4,953,019 | 9/1990 | Skikakura et al. | 358/133 |
| 4,977,461 | 12/1990 | Ichimura | 358/336 |

FOREIGN PATENT DOCUMENTS

| | | |
|---|---|---|
| 0180764 | 5/1986 | European Pat. Off. . |
| 0235782 | 9/1987 | European Pat. Off. . |
| 0300732 | 1/1989 | European Pat. Off. . |
| 0104875 | 6/1984 | Japan ................. 358/336 |
| 0045973 | 3/1985 | Japan ................. 358/336 |
| 63-55477 | 3/1988 | Japan . |
| 1-43876 | 1/1989 | Japan . |
| WO86/06199 | 10/1986 | WIPO . |

*Primary Examiner*—Robert W. Beausoliel, Jr.
*Assistant Examiner*—Ly V. Hua
*Attorney, Agent, or Firm*—Fitzpatrick, Cella, Harper & Scinto

[57] ABSTRACT

A device for processing a digital code train including a video signal on a transmission line, wherein the write operation of the digital code train into a memory is controlled in accordance with an output from an error detection circuit for detecting a code error of the digital code train, thereby obtaining a good image even if some code of the digital code train is destroyed.

18 Claims, 4 Drawing Sheets

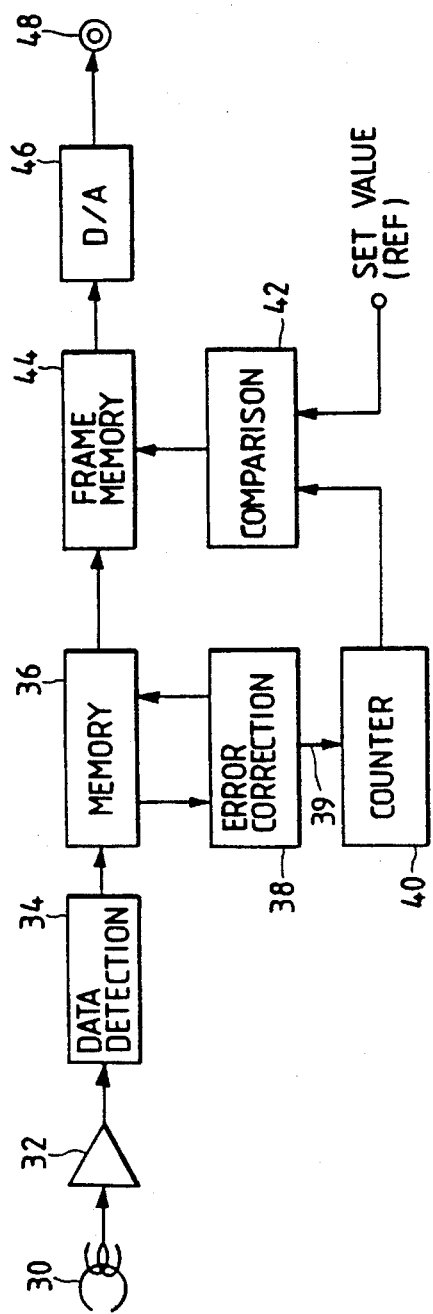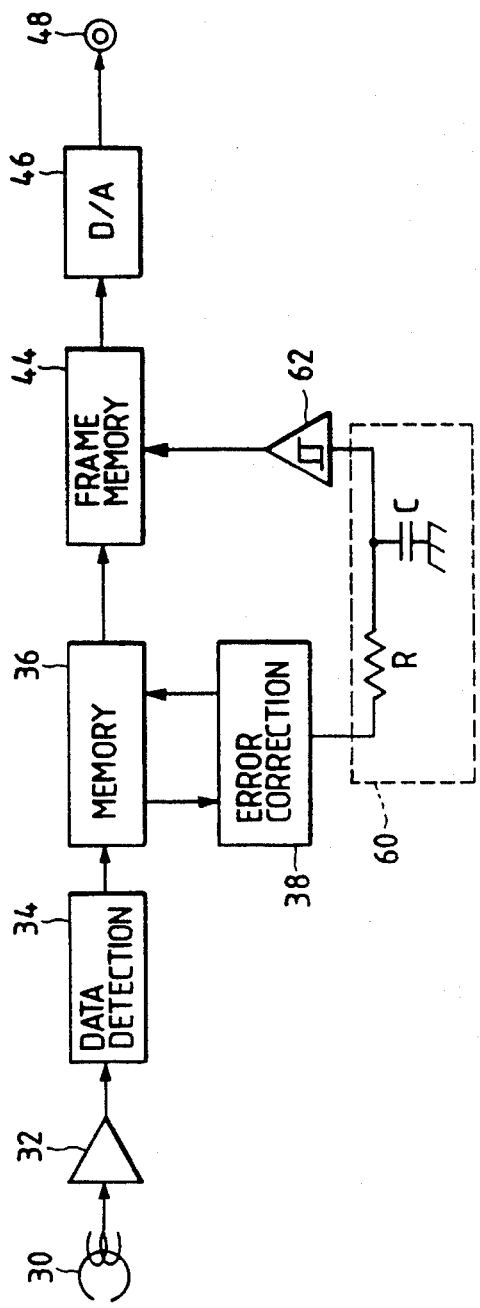

DEVICE FOR PROCESSING TRANSMITTED DIGITAL VIDEO SIGNAL

This application is a continuation of application Ser. No. 08/008,828 filed Jan. 25, 1993, which is a continuation of Ser. No. 07/523,547, filed May 15, 1990, both now abandoned.

BACKGROUND OF THE INVENTION

1. Field of the Invention

The present invention relates to a device for processing video signals transmitted on a transmission line such as a magnetic recording/reproducing system in which erroneous codes are likely to be generated.

2. Related Background Art

In a conventional digital video signal reproducing apparatus such as a digital VTR as shown in FIG. 1, a rotary head 10 mounted on a rotary cylinder converts a magnetic signal recorded on a video tape into an electric signal, which is amplified by an amplifier 12 and converted into digital data by a data detection circuit 14 such as a comparator. The output data from the data detection circuit 14 contains errors in some cases. The output data is temporarily written in a memory 16 so that an error correction circuit 18 corrects errors while referring to error correction codes (to be described later) added when the data was recorded. Specifically, the error correction circuit 18 reads the data in the memory 16 to correct errors therein, and writes the corrected data again in the memory 16. The corrected data is read from the memory 16 and converted into an analog signals by a D/A converter 20 to be sent to a video apparatus (not shown) from a video output terminal 22.

In a digital recording system for recording a video signal in the form of a digital signal in a recording medium, an error correction technique is generally used whereby one frame video data is divided into blocks each having a predetermined number of data, and an error correction code is added to each block when the data is recorded, to thereby correct errors at the time of recording/reproducing. In the reproducing operation, a predetermined number of errors generated at the time of recording/reproducing can be corrected by using error correction codes. FIG. 2 shows an example of a block format. In this format, "Sync" is a code representative of the top of a block. "ID" is a code representative of the frame area of each block or symbol. "CRCC (Cyclic Redundancy Check Code)" is an error detection correction code for ID. "Data" represents data in a block, and "P" is a parity for the above-described error correction code.

The data in each block is reproduced from a magnetic tape, and written in a frame memory at an area corresponding to its ID to then restore the original image.

Consider now that after recording a TV program in a video tape, another TV program is recorded in the remaining area of the video tape. Conventionally, the other TV program starts to be recorded regardless of the alignment of recording tracks, so that as shown in FIG. 3, the other program overwrites the previous program at the intersection area of track patterns. Accordingly, the width of the previous track becomes narrow at the intersection area so that data reproduction from the narrow track becomes difficult, resulting in an increased error rate of reproduced signals and in flickers in a reproduced image.

Further, a conventional video signal reproducing apparatus of such digital recording type has a problem in that the quality of a reproduced image is considerably degraded during a reproducing operation other than a normal reproducing operation. For example, during a high speed search reproducing operation, the envelope level of an output from a reproducing head becomes very small periodically as shown in FIG. 4A to that of the reproduced codes and at such a portion they have a lower reliability and a higher possibility of errors.

Also during the normal reproducing operation, if large foreign matters or dust are maintained fixed to a reproducing head over several lines, disturbed images cannot be compensated even with a drop-out compensation circuit, resulting in large flickers in the reproduced image.

The above problems are commonly associated with an apparatus which transmits a digital video signal via a transmission line such as a magnetic recording/reproducing line having a high error occurrence possibility.

SUMMARY OF THE INVENTION

It is therefore an object of the present invention to solve the above problems under such circumstances.

It is another object of the present invention to provide a video signal processing device capable of suppressing flickers in a reproduced image even if video data is destructed during transmission.

According to an embodiment of the present invention which solves the above problems, there is provided a device for processing a digital code train including a video signal on a transmission line, comprising means for detecting a code error of said digital code train; a memory capable of writing said digital code train; and memory controlling means for controlling the writing of said digital code train into said memory in accordance with an output from said error detecting means.

The above and other objects and advantages of the present invention will become apparent from the following detailed description of the embodiments.

BRIEF DESCRIPTION OF THE DRAWINGS

FIG. 5 is a block diagram showing the structure of a digital video signal reproducing apparatus according to an embodiment of this invention;

FIG. 6 is a block diagram showing the structure of a digital video signal reproducing apparatus according to another embodiment of this invention.

DETAILED DESCRIPTION OF PREFERRED EMBODIMENTS

Figure 1:
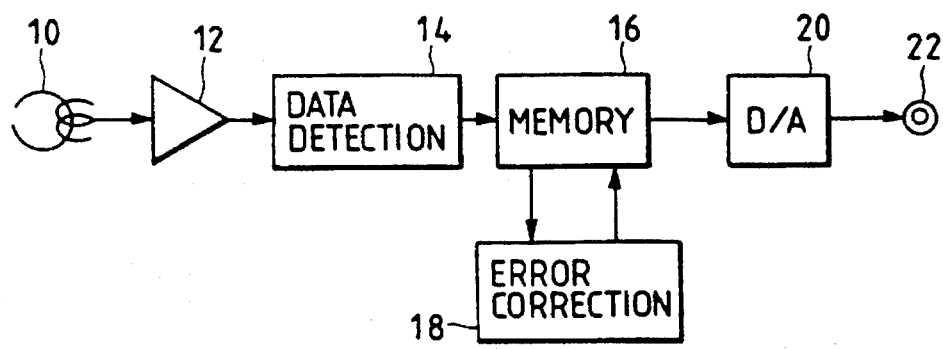
FIG. 1 is a block diagram showing the structure of a conventional digital video signal reproducing apparatus.

The embodiments of the present invention will be described with reference to the accompanying drawings.

FIG. 5 is a block diagram showing the structure of an embodiment of this invention. A rotary head 30 converts a magnetic signal on a video tape (not shown) into an electric signal, which is amplified by an amplifier 32. Similar to the data detection circuit 14, a data detection circuit 34 converts an output from the amplifier 32 into a digital signal, which is written in a memory 36.

Similar to the error correction circuit 18, an error correction circuit 38 corrects errors of the video data stored in the memory 36 while referring to error correction codes. In a digital VTR, one frame video data is divided into blocks each having a plurality of pixels, and the one frame video data has been subjected to various processings such as coding and error-correction-coding. The error correction circuit 38 not only corrects errors but also outputs a check result signal 39 of an error check/correction parity for each block. The check result may by a "0" output for a block without error and a "1" output for a block with error. A counter 40 counts the check result signal 39 for each frame. Namely, the counter 40 outputs the number of error blocks per one frame. A comparator 42 compares an output from the counter 40 with a present value REF. If the number of blocks is the present value or more, a "1" signal is outputted, whereas if it is less than the present value REF, a "0" signal is outputted.

The data error-corrected by the error correction circuit 38 and stored in the memory 36 is read out therefrom and supplied to a frame memory 44. As will be understood from the later description, the video data one frame before has been stored in the frame memory 44. Therefore, if the comparator 42 outputs "1", the write operation into the frame memory 44 is stopped for one frame, and only the read operation is allowed. In other words, video signals of the same frame are sequentially read from the frame memory 44, which is held in a freeze state. As a result, the frame memory 44 is inhibited to be renewed by the data stored in the memory 36. On the other hand, if the comparator 42 outputs "0", both the read and write operations for the frame memory 44 are permitted. Therefore, the frame memory 44 is renewed by the data stored in the memory 36.

The video data read from the frame memory 44 is converted into analog data by a D/A converter 46 and outputted to a video apparatus (not shown) via a video output terminal 48.

Figure 3:
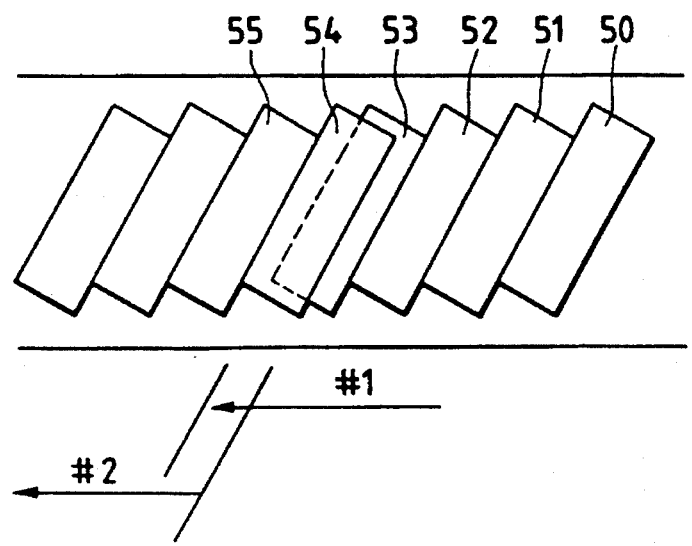
FIG. 3 shows an example of record patterns of video signals on a magnetic tape.

The operation of this embodiment will be described taking as an example the case as shown in FIG. 3. One frame video data is recorded respectively on tracks 50 and 51, tracks 52 and 53, and tracks 54 and 55. Although a frame image with less error can be reproduced from tracks 50 and 51, a reproduced image from tracks 52 and 53 has a number of errors because about half of the data on track 53 is destructed by track 54. According to this embodiment, assuming that the present value REF of the comparator 42 is set to one fourth the number of blocks constituting one frame, the frame memory 44 is held in a freeze state for inhibiting the data write operation into the memory 44 if the data corresponding to one fourth the frame is destructed. A reproduced image with less error at one frame before is outputted instead of the present frame.

FIG. 6 is a block diagram showing the structure of another embodiment of this invention. In this embodiment, in place of the counter 40 and comparator 42, there are provided an analog integrator 60 and a comparator 62 having an input/output hysteresis characteristic. Specifically, the check result signal 39 from the error correction circuit 38 is integrated by the analog integrator 60, and the integrated signal is supplied to the comparator 62 by which the output of the integrator 60 is compared with a threshold level having the hysteresis characteristic. The comparator 62 changes its output from "0" to "1" when an output of the integrator 60 exceeds a predetermined level Vth 1, and changes its output from "1" to "0" when the output lowers a predetermined level Vth 2 lower than Vth 1. An output of the comparator 62 controls the data write into the frame memory 44 in units of frame, in a similar manner to the comparator 42 shown in FIG. 5.

The embodiment shown in FIG. 6 can achieve the desired object with a relatively simple circuit arrangement.

As readily understood from the foregoing description, with the embodiments shown in FIGS. 5 and 6, even if a number of video data are destructed, flickers in an image can be suppressed to thus allow a reproduced image of less flicker.

Figure 7:
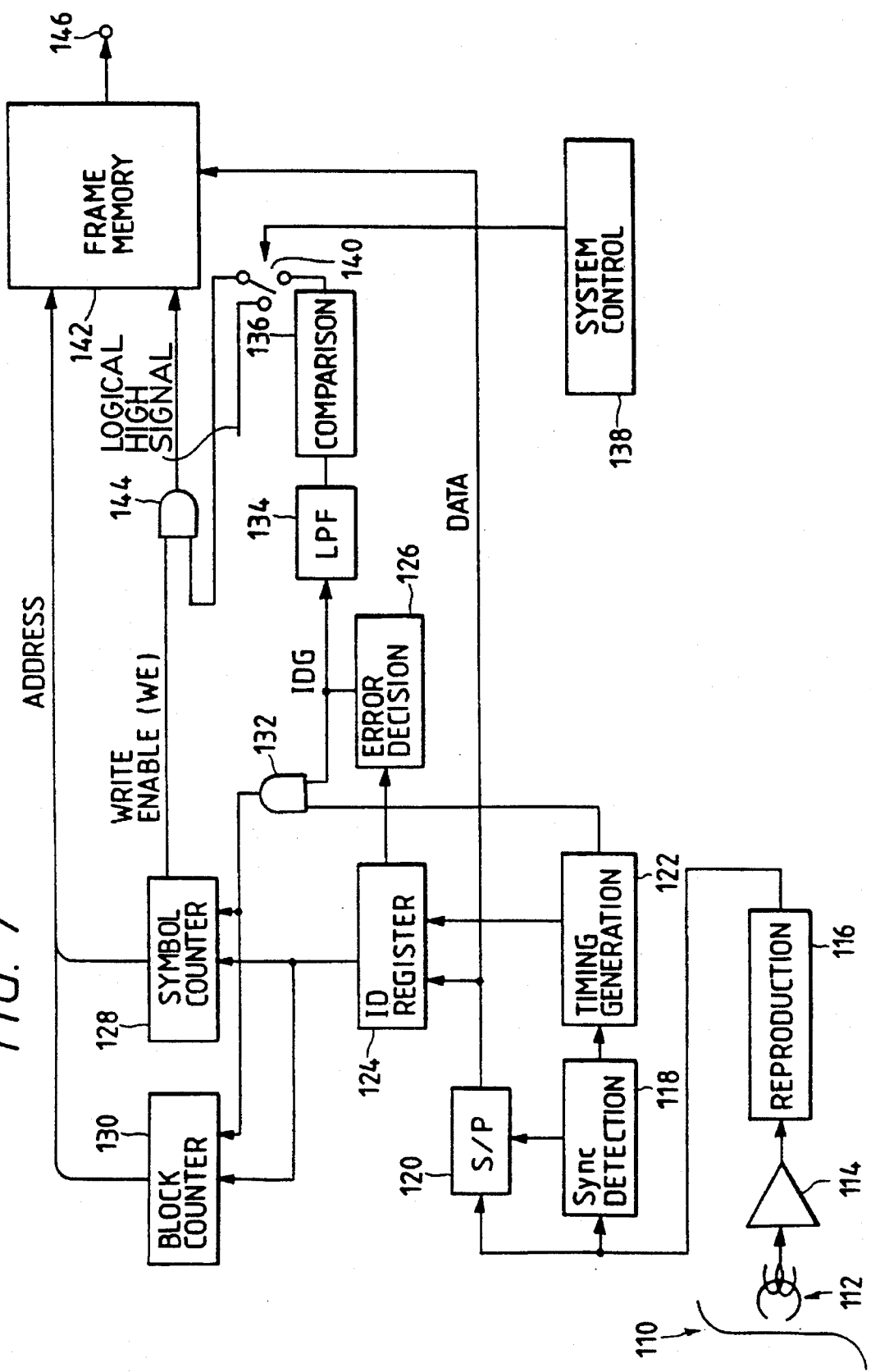
FIG. 7 is a block diagram showing the structure of a digital video signal reproducing apparatus according to a still further embodiment of this invention.

FIG. 7 is a block diagram showing the structure of a still further embodiment of this invention. Reference numeral 110 represents a magnetic tape on which a digital video signal is recorded, 112 a magnetic head, 114 an amplifier, 116 a reproduction circuit for converting an output (analog signal) from the amplifier 114 into a digital data signal, and 118 a Sync detection circuit for detecting a Sync code indicating the head of a block. A serial to parallel (S/P) converter 120 converts a serial data outputted from the reproduction circuit 116 into a parallel data of 8 or 4 bits. A timing generator 122 generates a predetermined timing signal in accordance with a Sync code detected by the Sync detection circuit 118.

An ID register 124 stores an ID within a reproduced block. An error decision circuit 126 decides in accordance with a CRCC added to the ID whether or not an error is present and outputs a flag IDG if there is no error. A symbol counter 128 has a symbol data of ID as its initial value, and counts a data symbol of 8 or 4 bits. A block counter 130 uses as its initial value a block data of ID, and counts the number of blocks. An AND gate 132 controls the count of the counters 128 and 130 by using an output (IDG) from the error decision circuit 126. A comparator 136 compares an output from an analog low-pass filter (LPF) 134, which eliminates the high frequency components of the binary signal of the flag IDG, with a predetermined threshold value. A system control circuit 138 controls the entirety of the circuit during a normal reproduction operation, a search operation and the like. A switch 140 is controlled to open or close by the system control circuit 138. The system control circuit 138 closes switch 140 when a specific reproduction operation is to be used, and opens switch 140 for a normal reproduction operation. When switch 140 is open, a high level logic signal is applied to one input of AND gate 144. A frame memory 142 is supplied with a write enable (WE) signal from an AND gate 144. The symbol counter 128 passes the signal from AND gate 132, which indicates error-free ID data in ID register 124, to an input of AND gate 144. The count of the symbol counter 128 is applied to the frame memory 142 as its lower address, and the count of the block counter 130 is supplied as the upper address.

Figure 2:
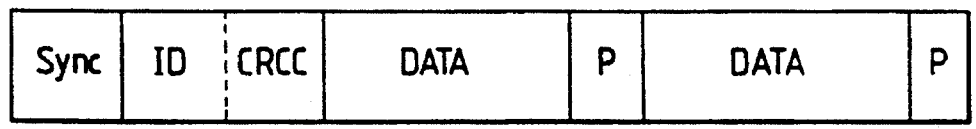
FIG. 2 shows an example of a block format of video data recorded in a recording medium.

The operation of the above embodiment will be described taking a search mode as an example. An output of the magnetic head 112 is amplified by the amplifier 114 and converted into a digital data by the reproduction circuit 116. The output from the reproduction circuit 116 is a code train of the block structure as shown in FIG. 2. The Sync detection circuit 118 detects the top code of the block. In accordance with an output from the Sync detection circuit 118, the timing generator 122 generates a fetch timing signal for the ID register 124, a reset timing signal for the counters 128 and 130, and other timing signals.

An output data from the reproduction circuit 116 is converted into a parallel data by the S/P converter 120. The ID data is sorted in the ID register 124, and is loaded as the initial value into the symbol counter 128 and block counter 130. Under the state that the reproduced output level of the magnetic head 112 is sufficiently high, there is scarcely any error in the ID information so that the error decision circuit 126 outputs the flag IDG in a stable manner. Accordingly, the AND gate 132 supplies the output from the timing generation circuit 122 to the counters 128 and 130 in a stable manner. Thus, each time the IDG flag is output to indicate that the data in ID register 124 is error-free, ID data from the ID register 124 is loaded as the new initial values into symbol counter 128 and block counter 130. The counts of the counters 128 and 130 are supplied as the lower and upper addresses to the frame memory so that the video data outputted from the S/P converter 120 is written in the frame memory 142 at the designated address.

Figure 4A:
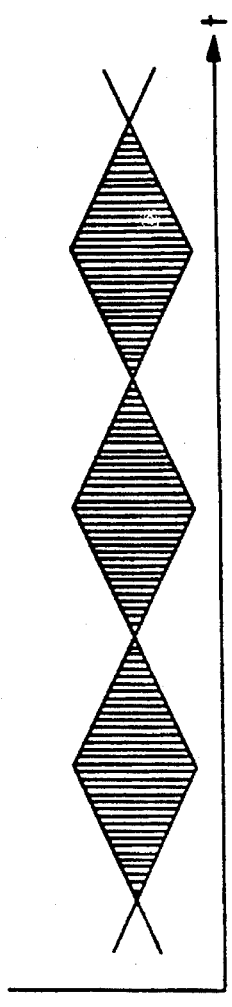
FIGS. 4A to 4D are timing charts for explaining the video signal reproducing operations according to a prior art and embodiments of this invention.
Figure 4B:
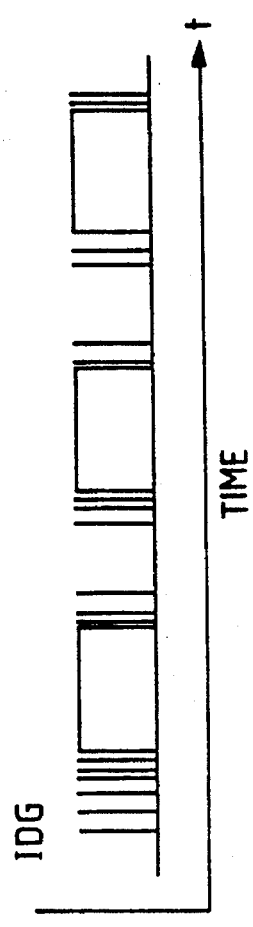
Figure 4C:
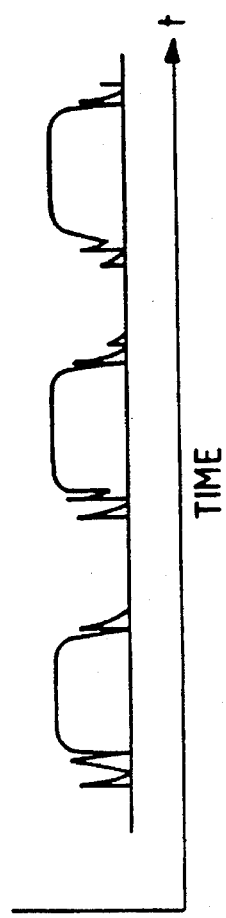
Figure 4D:
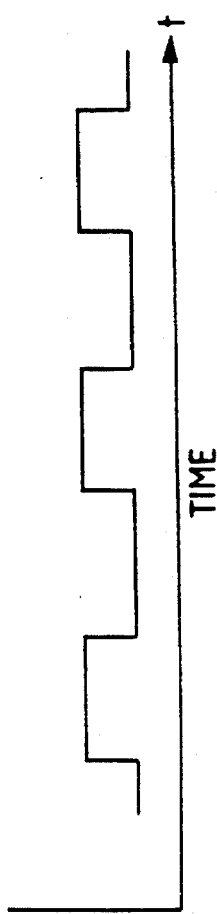

With the above operation, the block video data reproduced from the magnetic tape is written in the frame memory 142. Next, there will be described the operation when the reproduced output level of the magnetic head 112 has lowered. In this case, there are many errors in the reproduced data. The error decision circuit 126 detects errors in accordance with the CRCC contained in the ID information in the ID register 124. If there are errors, the circuit tends to output less the flag IDG as shown in FIG. 4B. More in particular, while the envelope level of a reproduced output from the magnetic head 112 is large, the flag IDG is generated in a stable manner. However, while the envelope level of a reduced output is small, the flag IDG is scarcely generated, and during the intermediate region, the flag IDG is generated in an unstable manner. The output (FIG. 4B) from the error decision circuit 126 has the waveform as shown in FIG. 4C after passing through LPF 134, and has the waveform as shown in FIG. 4D after passing through the comparator 136. The output from the comparator 136 operates as the signal for judging if there is an error in the ID information by changing from a first value to a second value.

The switch 140 is closed if LPF 134 and comparator 136 are used, i.e., if a specific reproduction operation is to be used. The output from the comparator 136 is supplied via the switch 140 to the AND gate 144. The AND gate 144 is closed if an error is always or occasionally present in the ID information, to thereby prohibit the application of the write enable signal to the frame memory 142. As a result, the reproduced data, i.e., image data assumed to contain many errors, is not written in the frame memory 142 and a relatively good search image can be obtained.

As readily understood from the foregoing description, according to the embodiment shown in FIG. 7, it is possible to obtain by using a very simple structure a signal which judges an occurrence of error in the reproduced data. This signal is used for controlling the write operation of the image memory, to thereby obtain a good reproduced image.

A digital VTR has been used as an example in the above embodiment. This embodiment is applicable not only to a tape type recording medium, but also other recording medium such as an optical disk, magnetooptical disk and the like whereby when the data becomes difficult to be read from such a recording medium because of scratches or the like, the write operation of video signals into the memory is prohibited to suppress flickers in a reproduced image output. Further, if the embodiment is applied to a receiver in a system wherein a video signal is transmitted via a transmission path such as a radio transmission, wire transmission or the like, flickers in a reproduced image due to various interference waves can be avoided. Namely, the invention is advantageously applicable to a system wherein a moving image is recorded digitally or transmitted, and particularly applicable to a system which has a possibility of data destruction for some reason.

What is claimed is:

1. A device for processing a digital code train on a transmission line, said digital code train including error detection/correction codes and video codes, comprising:

(a) error detecting means for detecting a code error of said digital code train by using said error detection/correction codes, and for generating a detection signal indicating whether or not a frequency of code error occurrences is higher than a predetermined rate;

(b) a memory, coupled to said error detecting means, for storing said video codes;

(c) control means for controlling a writing operation of the video codes into said memory; and (d) mode changing means, coupled to said control means, for changing said device between a first mode in which said control means controls whether or not the video codes are written into said memory in accordance with the detection signal generated by said error detecting means, and a second mode in which said control means controls whether or not the video codes are written into said memory irrespective of the detection signal generated by said error detecting means.

2. A device according to claim 1, wherein said digital code train comprises a number of data blocks each including video codes and error detection/correction codes, and said error detecting means detects if there is an uncorrectable code error in each data block by using said error detection/correction codes, and outputs a flag in accordance with the detection result.

3. A device according to claim 2, wherein said error detecting means comprises a flag processing circuit for detecting whether or not the frequency of occurrences of said flag is higher than a predetermined rate, and for generating the detection signal, and wherein said control means controls the writing operation of said video codes into said memory in accordance with the detection signal generated by said flag processing circuit only in said first mode.

4. A device according to claim 3, wherein said flag processing circuit detects a frequency of occurrences of said flag in one picture portion of said video codes, and wherein said control means controls whether or not the video codes are written into said memory in units of said one picture portion.

5. A device according to claim 3, wherein
    said flag is a binary signal, and said flag processing circuit comprises a circuit for eliminating the high frequency components of said binary signal.

6. A device for processing digital code train including error correction codes and video codes for a plurality of frames on a transmission line, comprising:

(a) a first memory for storing said digital code train;

(b) error correction means, coupled to said first memory, for correcting code errors occurring in said video codes in said first memory by using said error correction codes and outputting an error flag in response to a presence of an uncorrected code error;

(c) a second memory, coupled to said first memory, for storing said video codes that are read out from said first memory, said second memory, storing one frame of the video codes;

(d) detection means, coupled to said error correction means, for detecting whether or not an occurrence rate of said error flag in each frame of the video codes is higher than a predetermined rate and for outputting a signal indicating the detection result; and (e) control means for controlling, in units of one frame, whether or not the video codes are written into said second memory in accordance with the output of said detection means.

7. A device according to claim 6, wherein said detection means comprises (i) a counter for counting said error flag occurrences in each frame of the video codes, and (ii) a comparator, coupled to said counter, for comparing said count value, determined by said counter, with a pre-determined value.

8. A device according to claim 6, wherein said error flag comprises a binary signal, said detection means comprising (1) a low-pass filter to which said binary signal is inputted, and (2) a comparator, coupled to said low-pass filter, for comparing an output from said low-pass filter with a pre-determined value.

9. A device according to claim 6, wherein said digital code train comprises a number of data blocks each having video codes and error correction codes, and wherein said error correction means outputs the error flag in response to the presence of the uncorrected code error in each of said data blocks.

10. A device for processing a digital code train including error detection/correction codes and video codes for a plurality of frames on a transmission line, comprising:

(a) a first memory for storing said digital code train;

(b) error correction means, coupled to said first memory, for correcting code errors occurring in said video codes in said first memory by using said error detection/correction codes;

(c) a second memory, coupled to said first memory, for storing said video codes that are read out from said first memory, said second memory storing one frame of the video codes;

(d) detection means, coupled to said error correction means, for detecting whether or not an occurrence rate of the code errors is higher than a predetermined rate in each frame by using said error detection/correction codes, and for outputting a signal indicating the detection result; and (e) control means for controlling, in units of one frame, whether or not the video codes are written into said second memory in accordance with the output of said detection means.

11. A device for processing a digital code train including error detection/correction codes and video codes for a plurality of frames on a transmission line, comprising:

(a) error correction means for correcting code errors occurring in said video codes by using said error detection/correction codes;

(b) a memory, coupled to said error correction means, for storing said video codes that are processed through said error correction means, said memory storing one frame of the video codes;

(c) detection means, coupled to said error correction means, for detecting whether or not an occurrence rate of the code errors is higher than a predetermined rate for each frame of the video codes by using said error detection/correction codes, and for outputting a signal indicating the detection result; and (d) control means for controlling, in units of one frame, whether or not the video codes are written into said memory in accordance with the output of said detection means.

12. A device according to claim 11, wherein said error correction means outputs an error flag in response to a presence of an uncorrected code, and wherein said detection means comprises a counter for counting said error flag occurrences in each frame of the video codes.

13. A digital code train processing apparatus comprising:

(a) a transmission line for transmitting a digital code train;

(b) detection means for detecting a code error of the digital code train;

(c) memory means for writing thereinto the digital code train; and (d) control means for controlling the writing of the digital code train into the memory means, said control means having a first mode in which the writing of the digital code train is controlled on the basis of an output of said detection means, and a second mode in which the writing of the digital code train is controlled irrespective of the output of said detection means.

14. An apparatus according to claim 13, wherein said transmission line has an electro-magnetic conversion system including a magnetic head and a magnetic recording medium.

15. A device for reproducing a digital video signal comprising a plurality of frames, comprising:

(a) reproducing means for reproducing the digital video signal from a recording medium;

(b) forming means for forming a binary signal which indicates whether or not the digital video signal reproduced by said reproducing means is reliable;

(c) a memory for storing the digital video signal, said memory being capable of storing one frame of the digital video signal;

(d) detection means for detecting whether or not an occurrence rate of the binary signal indicating that the digital video signal is unreliable, is higher than a predetermined rate for each frame of the digital video signal, and for outputting a signal indicating the detection result; and (e) control means for controlling, in units of one frame, whether or not the digital video signal is written into said memory in accordance with the signal output by said detection means.

16. A device according to claim 15, wherein said detection means includes a counter for counting the binary signal which indicates that the digital video signal is unreliable in each frame of the digital video signal.

17. A device according to claim 15, wherein said detection means includes a low-pass filter to which the binary signal is input, and a comparator for comparing an output from said low-pass filter with a predetermined value.

18. A device for reproducing a digital video signal, comprising:

(a) reproducing means for reproducing the digital video signal from a recording medium;

(b) forming means for forming a binary signal which indicates whether or not the digital video signal reproduced by said reproducing means is reliable;

(c) a memory for storing the digital video signal; and (d) control means for controlling writing of the digital video signal into said memory, said control means having a first mode in which the writing of the digital video signal into said memory is controlled on the basis of the binary signal, and a second mode in which the writing of the digital video signal into said memory is controlled irrespective of the binary signal.

* * * * *

UNITED STATES PATENT AND TRADEMARK OFFICE
CERTIFICATE OF CORRECTION

PATENT NO. : 5,600,661
DATED : February 4, 1997
INVENTOR(S) : MAKOTA SHIMOKORIYAMA It is certified that error appears in the above-indentified patent and that said Letters Patent is hereby corrected as shown below:

COLUMN 5:

Line 5, "sorted" should read --stored--.
Line 16, "memory" should read --memory 142--.

COLUMN 6:

Line 48, "is" should read --comprises--.
Line 49, "the" should be deleted.

Signed and Sealed this

Twenty-third Day of September, 1997

Attest:

BRUCE LEHMAN

*Attesting Officer*  *Commissioner of Patents and Trademarks*